United States Patent [19]
Groh et al.

[11] Patent Number: 5,660,283
[45] Date of Patent: Aug. 26, 1997

[54] HIGH CLEAT CONVEYOR SYSTEM

[76] Inventors: George John Groh, 800 Lakeshore Pkwy.; Eric H. Groh, 6241 West End Blvd., both of New Orleans, La. 70124

[21] Appl. No.: 402,615

[22] Filed: Mar. 13, 1995

[51] Int. Cl.⁶ ........................................ B03C 1/00
[52] U.S. Cl. .................... 209/223.1; 198/690.2; 198/720; 198/836.1
[58] Field of Search ............ 209/223.1; 198/699, 198/720, 836.1, 690.2

[56] References Cited

U.S. PATENT DOCUMENTS

| | | |
|---|---|---|
| 242,963 | 6/1881 | Newton . |
| 492,751 | 2/1893 | Ross . |
| 803,402 | 10/1905 | Cox ................................ 198/699 |
| 1,053,209 | 2/1913 | Neuman . |
| 1,253,923 | 1/1918 | Atwood ......................... 198/699 X |
| 1,269,960 | 6/1918 | Przednowek .................. 198/699 |
| 2,105,610 | 1/1938 | O'Brien . |
| 2,167,818 | 9/1939 | Wagner . |
| 2,365,762 | 12/1944 | Johns et al. . |
| 2,375,065 | 5/1945 | Askue ............................ 198/699 |
| 2,430,282 | 11/1947 | Ensinger . |
| 2,635,735 | 4/1953 | Smith . |
| 2,645,745 | 7/1953 | Moreton ...................... 209/223.1 X |
| 3,306,218 | 2/1967 | Reeves . |
| 3,407,918 | 10/1968 | Clarke . |
| 3,464,538 | 9/1969 | Hartmann . |
| 3,515,256 | 6/1970 | Martin et al. . |
| 3,532,367 | 10/1970 | Stancari . |
| 3,595,379 | 7/1971 | Campbell . |
| 3,756,382 | 9/1973 | Adey, Jr. et al. . |
| 3,854,571 | 12/1974 | Siirtola ......................... 198/699 X |
| 4,147,557 | 4/1979 | Mayo . |
| 4,162,727 | 7/1979 | Summers . |
| 4,321,996 | 3/1982 | Sancken et al. ............. 198/690.2 X |
| 4,660,367 | 4/1987 | Kawarabashi . |
| 4,674,626 | 6/1987 | Adcock ........................... 198/720 X |
| 4,763,774 | 8/1988 | Johansson . |
| 4,815,580 | 3/1989 | Schanz et al. . |
| 4,860,881 | 8/1989 | Sticht ............................ 198/699 X |
| 4,989,727 | 2/1991 | Gordon . |
| 5,137,144 | 8/1992 | Uehara . |
| 5,154,280 | 10/1992 | Mott . |
| 5,350,050 | 9/1994 | Franke . |

*Primary Examiner*—D. Glenn Dayoan
*Attorney, Agent, or Firm*—Joseph T. Regard, Ltd.

[57] ABSTRACT

A high cleat rubber carrier system for conveying material at various angles, from generally horizontal to sixty degrees plus. The present invention also teaches a new and unique system for conveying chopped cane or bagasse at low, moderate, or high angles (for example, 40 degrees plus) during the refining process, for example, from a gravity chute to a donnely chute gravity compactor. Unlike traditional bagasse under-carrier conveyors, the present invention teaches a top carrier conveyer arrangement, which, as designed, has been found to convey even traditionally difficult materials, including, for example, chopped cane, bagasse, and other fibrous materials, even at relatively high angles, with little or no clogging. The present invention contemplates a skirted, cleated, endless belt conveyer having a transition plate disposed adjacent to the discharge chute, the transition plate affixed to catch return underpan situated below the conveyor, for catching debris or "carry back" missing the discharge chute, to re-feed the debris back onto the conveyor.

10 Claims, 6 Drawing Sheets

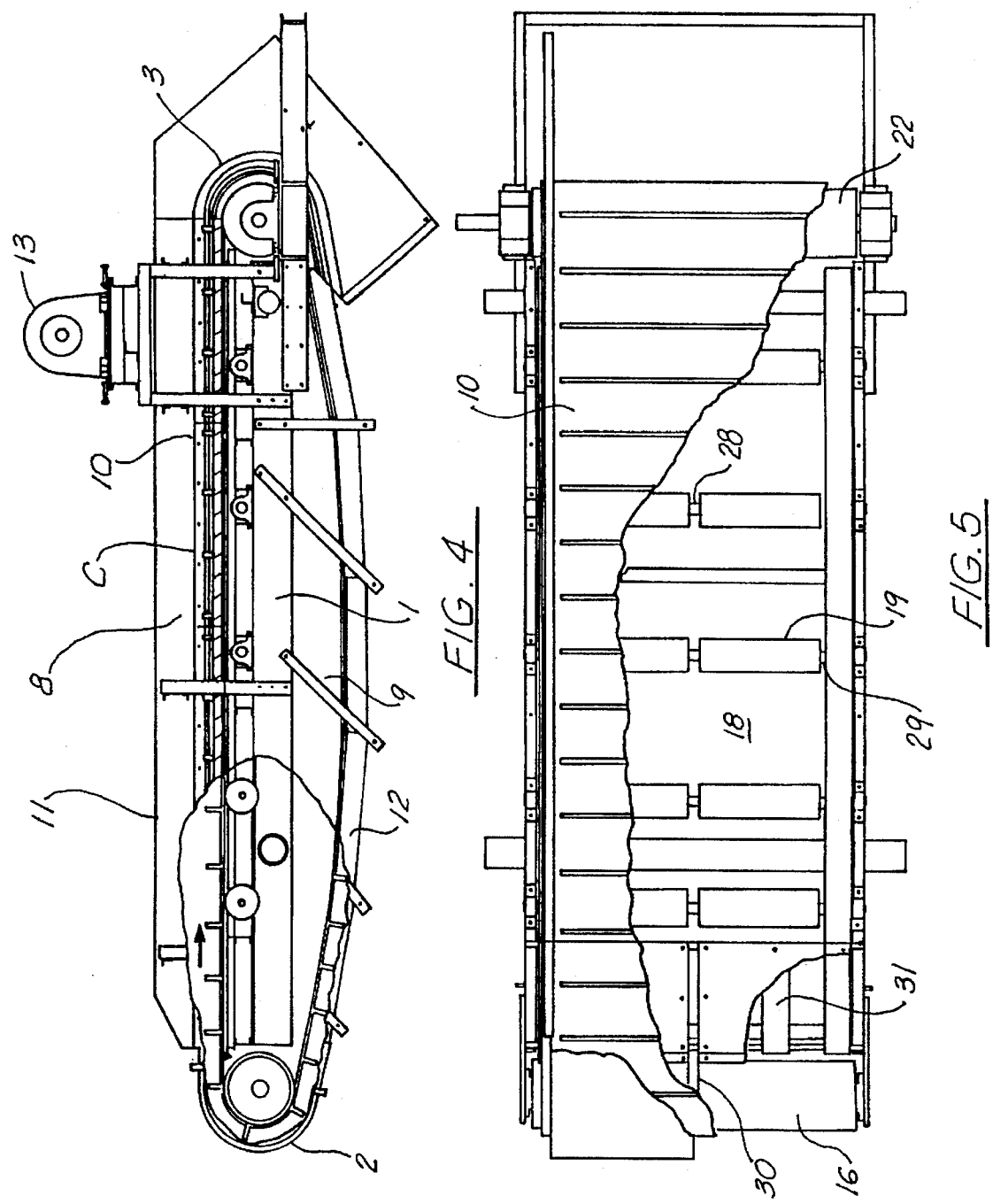

5,660,283

HIGH CLEAT CONVEYOR SYSTEM

TECHNICAL FIELD OF THE INVENTION

The present invention relates to endless belt conveyor systems, and in particular to a "high cleat rubber carrier" system for conveying material at various angles, from less than or generally horizontal, to a high angle.

The present invention also teaches a new and unique system for conveying chopped cane or bagasse, at low, moderate, or high angles (for example, 40 degrees plus) during the refining process, for example, from a gravity chute to a donnely chute gravity compactor.

Unlike traditional bagasse under-carrier conveyors, the present invention teaches a top carrier conveyer arrangement, which, as designed, has been found to convey even traditionally difficult materials, including, for example, chopped cane, bagasse, and other fibrous materials, even at relatively high angles, with little or no clogging.

The present invention contemplates a skirted, cleated, endless belt conveyer having a transition plate disposed adjacent to the discharge chute, the transition plate affixed to catch return pan situated under the conveyor, for catching debris or "carry back" missing the discharge chute, to re-feed the debris back onto the conveyor.

BACKGROUND OF THE INVENTION

Traditionally, endless belt under-carrier conveyors have been utilized to convey chopped cane or bagasse from one mill to another during the refinement of sugar cane. While top carrier conveyors had been attempted in the past, they utilized traditional endless belt conveyor designs, and tended to clog and require high maintenance, due particularly to the fibrous cane material which was conveyed, which tended to clog and become impacted into the mechanism in various places, and freezing same. Further, past top carrier conveyor designs had limitations as to the angle of operation, as the chopped cane would roll back or spill during operation.

A list of prior patents which may be pertinent to the present invention is set forth below:

| Patent Number | Inventor | Issue Date |
|---|---|---|
| 42,963 | Newton | 06/14/1881 |
| 492,751 | Ross | 02/28/1893 |
| 1,053,209 | Neuman | 02/18/1913 |
| 2,105,610 | O'Brien | 01/18/1938 |
| 2,167,818 | Wagner | 09/01/1939 |
| 2,365,762 | Johns et al. | 12/26/1944 |
| 2,430,282 | Ensinger | 11/04/1947 |
| 3,306,218 | Reeves | 02/28/1967 |
| 3,407,918 | Clarke | 10/29/1968 |
| 3,464,538 | Hartmann | 09/02/1969 |
| 3,515,256 | Martin et al. | 06/02/1970 |
| 3,532,367 | Stancari | 10/06/1970 |
| 3,595,379 | Campbell | 07/27/1971 |
| 3,756,382 | Adey, Jr et al. | 09/04/1973 |
| 4,147,557 | Mayo | 04/03/1979 |
| 4,321,996 | Sancken et al | 03/30/1982 |
| 4,660,367 | Kawarabashi | 03/28/1987 |
| 4,763,774 | Johansson | 08/16/1988 |
| 4,815,580 | Schanz et al. | 03/28/1989 |
| 4,989,727 | Gordon | 02/05/1991 |
| 5,137,144 | Uehara | 08/11/1992 |
| 5,350,050 | Franke | 09/27/1994 |
| 5,514,280 | Mott | 10/13/1992 |

U.S. Pat. No. 4,321,996 issued 1982 to an Illinois applicant, and assigned to A. O. Smith Harvester Products, Inc., contemplates a cleated belt forage conveyor configured to prevent spillover, while preventing jamming via the utilization of vibrating deflector plates and the like. This patent is significant in that it teaches an undercarriage and carry back pan pertinent to the present searched for invention, in conjunction with laterally situated, generally evenly spaced belt cleats or treads. See, for example, FIG. 5 of the patent.

Further, '996 further contemplates the utilization of side walls to prevent spillage. The '996 patent is configured for conveying agricultural forage from a lower gravity feed arrangement, upward at an angle to discharge via gravity into a hopper or the like (FIG. 1).

U.S. Pat. No. 242,963 illustrates a "Cotton Elevator" issued 1881 comprising a high angle, endless belt conveyor having slats (M) and side walls (A'), as well as a hopper (H) for catching and retaining cotton seed, under the conveyor.

U.S. Pat. No. 492,751 contemplates a "Carrier Attachment" dated 1893, for conveying feed or the like, utilizing an endless belt under carrier configuration. (FIG. 10).

U.S. Pat. No. 3,407,918 issued 1968 teaches an "Apparatus for breaking up and conveying fibrous textile materials" at a relatively high angle from a horizontal conveyor to a hopper or chute. The system teaches an endless belt having intermittently displaced thereupon slats and claws or the like, with side walls along said belt.

U.S. Pat. No. 2,105,610 issued 1938 teaches an "Automatic bagger and loader" comprising an endless belt conveyer having cross bars thereon, the conveyor disposed at about a 45 degree angle (apparently adjustable), a hopper gravity feed at its lower point, and discharge chute about its upper point. The system contemplates the utilization of side walls to prevent spillage.

U.S. Pat. No. 4,147,557, issued 1979 teaches a "Method and apparatus for feeding a sugar cane mill", teaching an under carry conveyor for conveying bagasse from one mill to the next.

The inventor is also aware that mechanical conveyors utilizing chain driven, slat and sprocket arrangements have been utilized for conveying sugar cane during the refining process for over 100 years.

Clearly, one can discern, based upon the above patents, that the prior art has not particularly taught or disclosed a conveyor system which can consistently and without clogging lift fibrous material such as chopped cane, bagasse, or the like at a relatively high angle.

GENERAL SUMMARY DISCUSSION OF THE INVENTION

The present invention contemplates a high cleat, unitary conveyor system which is specifically configured for utilization in the sugar cane refinement or like process, conveying a fibrous product such as chopped cane or the like in an effective, cost efficient matter with little down time, high productivity, and at various angles.

Unlike the prior art, the present system is specifically designed for utilization in conjunction with the movement of bagasse, a fibrous agricultural product which is the by-product of the sugar cane refinement process.

Over the past 150+ years of mechanized refining of sugar cane, the bagasse has proved to be a difficult material to mechanically handle, as its fibrous nature, combined with the sugar syrup released during the chopping process, causes the fibrous material to clump and collect in various places ordinary materials would not; as a result, traditional conveyors were plagued with jams and breakdowns, and thereby comprised high maintenance items.

In about the early 1960's, the design of the sugar cane mill evolved somewhat, adding an additional roller, coupled with an upper, vertical gravity chute for feeding the cane in a compacted fashion, known in the industry as a "donnely chute" (which was believed to originate out of South Africa). This system greatly increased the efficiency of the milling process, but made conveying of the bagasse from one mill to the other even more difficult, as it required lifting the material at higher angles than ever before, to dump the cane into the chute.

Traditional, top carrying, unitary belt conveyors were found to be ineffective in conveying the cane to the donnely chute, as it required the conveyor be set at an angle, often greater than 40 degrees (and sometimes as high as sixty degrees); at this angle, the cane would often roll back, clump, and/or roll off of the conveyor.

The top carrying belt conveyors, even with cleats (which were only about ¾ of an inch high), were unable to effectively move the cane at such high angles. Further, the exposed, mechanical nature of the traditional conveyor system resulted in increased breakdown and wear, due to the excessive spillage of the bagasse, and its getting caught in the mechanism.

Because the traditional, top carrying conveyors were ineffective at the increased angle, the industry began to utilize an under feed conveyor system, wherein the cane was fed into a conveyor with slats running through an underpan, which slats pushed the cane along an under pan, up to the donnely chute, where it was dumped therein. This is the system used today in the industry; however, this system too is plagued with problems. The conveyed cane is enclosed by the underpan, and subject to severe clogging as the cane is being lifted.

The present invention was configured to overcome these prior art problems, providing a new, top conveying system utilizing a unitary belt and oversized cleat system, side skirts for preventing spillage, as well as a capture system utilizing a return pan with a boot to recycle spillage.

The present system allows for the effective conveying of bagasse or the like to high angles such as, for example, sixty degrees plus, with far less frequent clogging problems, as was associated with the past systems.

The preferred embodiment of the present invention teaches the utilization of:

a rubber belt with oversized cleats and a center, longitudinally situated under guide;

a full length skirt system having continuous support under the belt, to keep the material contained;

curved and tapered end skirts about the tail and head pulleys to prevent material leakage;

a capture and return underpan arrangement for containing spillage;

a boot section to allow the cleated belt to convey spillage material from the underpan to re-feed the material to the top side of the conveyor;

a transition plate, for separating the discharge chute and return pan.

With the above, the present invention provides an effective system for conveying chopped cane or bagasse at low, moderate, or even relatively high angles (for example, 40 degrees plus) during the refining process, for example, from a gravity chute to the donnely chute gravity compactor, or in use in the initial feed of the first mill.

It is therefore an object of the present invention to provide a top carrying conveyor which is suitable for conveying fibrous materials such as bagasse or the like.

It is another object of the present invention to provide a conveyor system which is suitable for conveying chopped cane, bagasse, or other fibrous material at angles of fifty to sixty degrees plus, without significant roll back, clogging, or spillage.

It is another object of the present invention to provide an effective top conveyor system which may be juxtaposed two sugar cane mills, conveying cane from a first mill to a donnely chute on the second mill.

It is still another object of the present invention to provide a system for conveying fibrous materials utilizing a top conveyor which requires comparatively little maintenance, while conveying a relatively high volume of material.

Lastly, it is an object of the present invention to provide a top conveyor system for conveying various materials at relatively high angles, while including a capture means for capturing and reintroducing spillage to the conveyor stream.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 4 illustrates a side, partially cutaway view of the high cleat conveyor of FIG. 1, illustrating the recapture action of the present invention, particularly, the travel of the high cleat belt (and any misdirected material) through the underpan, about the boot area, and to the intake area.

FIG. 5 illustrates a top, partially cutaway view of the high cleat conveyor of FIG. 1, illustrating the roller and impact bed construction, and the interaction of the conveyor belt therewith.

FIG. 8 illustrates a side view of an alternative embodiment of the high cleat conveyor system of FIG. 1, illustrating the conveyor utilized at less than an extreme angle, at the initial stage of the milling process, in conjunction with metallic separation means.

DETAILED DISCUSSION OF THE INVENTION

Figure 1:
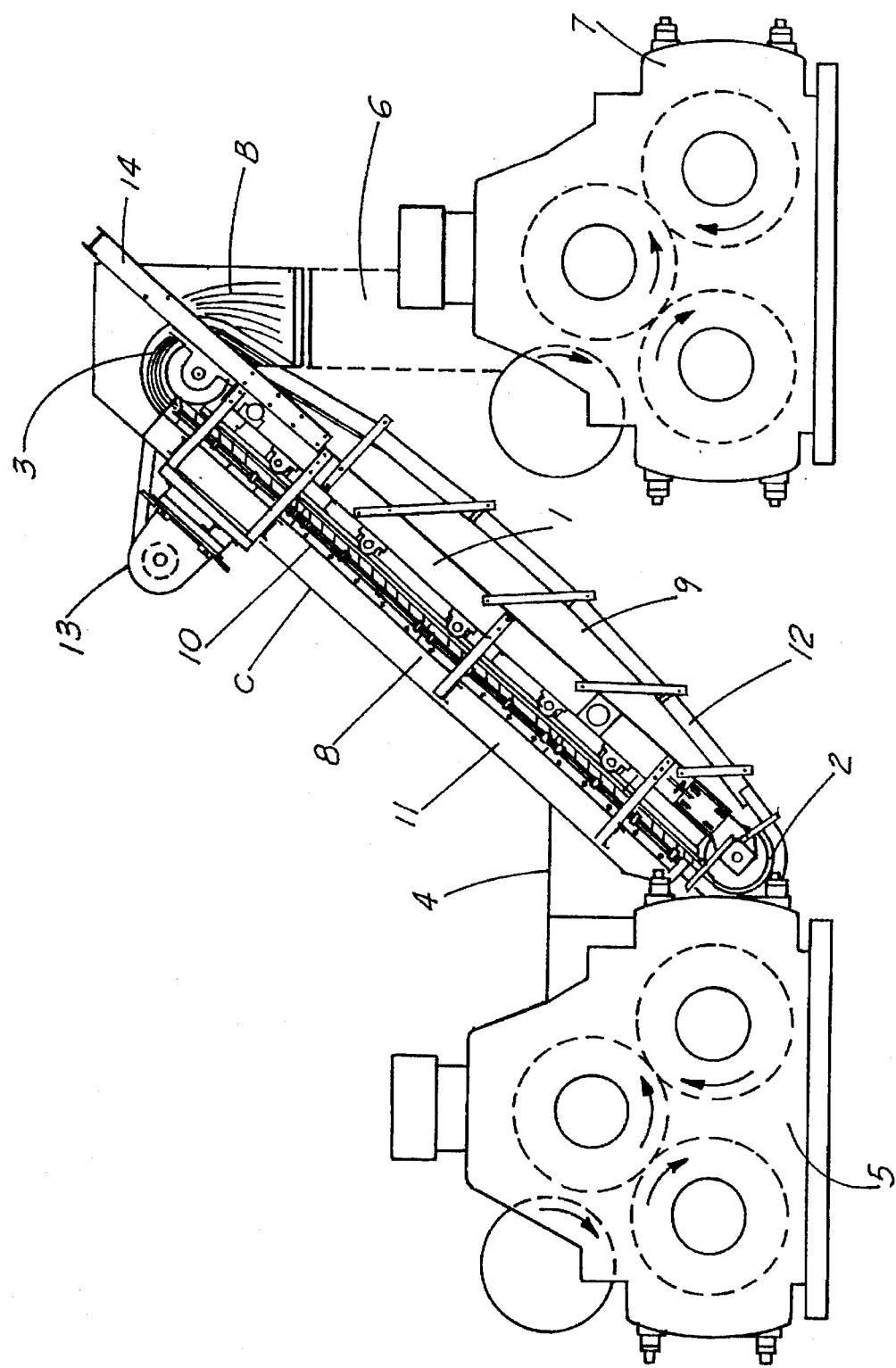
FIG. 1 illustrates a side view of the preferred embodiment of the high cleat conveyor system of the present invention, illustrating the conveyor juxtaposed first and second sugar cane mills, lifting chopped cane from the first mill to the donnely gravity chute of the second mill.

Referring to FIG. 1, the conveyor C of the preferred embodiment of the present invention is configured to be juxtaposed between first 5 and second 7 sugar cane grinding mills, lifting chopped and ground cane or bagasse B from the gravity chute 4 of the first mill 5, and depositing the material into the generally vertically situated donnely gravity chute 6, which is generally situated over the next, and, in this case, the second mill 7.

Referring to FIGS. 1 and 4, the conveyor C comprises a frame 1 having a first, lower end 2 and a second, upper end 3, as well as support member 14. In the present example, the conveyor C is situated at an angle of about forty-five degrees relative to the horizontal, but it is noted that this system is capable of lifting at extreme angles of up to about sixty degrees plus, as well as lower angles.

As is further shown, the conveyor has an upper, open, supporting face 8, upon which the bagasse is conveyed upon a belt 10 having on its conveying side a plurality of evenly spaced, laterally situated, raised cleats (which will be further described and shown infra), the material being further supported and held on the conveyor by side skirt plates 11 disposed adjacent to or immediately above the opposing outer side areas of the belt.

The conveyor also has a lower side area 9, which embodies the return system of the present invention, which includes an underpan 12 which envelops the cleated, conveying side of the belt 10, effectively conveying back to the upper, supporting fade 8 of the conveyor spillage and dust which failed to dispense the last cycle.

The preferred embodiment of the present invention is powered via drive motor 13, with gear reduction, such as, for example, the 25 HP Model FDI by Link Belt, with an exemplary conveyor having, for example, a belt about 90 inches wide, 50 Feet long, with cleats 6 inches high. At a 45° angle, this system should convey 7,000 tonns of bagasse per day at a speed of about 280 feet per minute.

Figure 2:
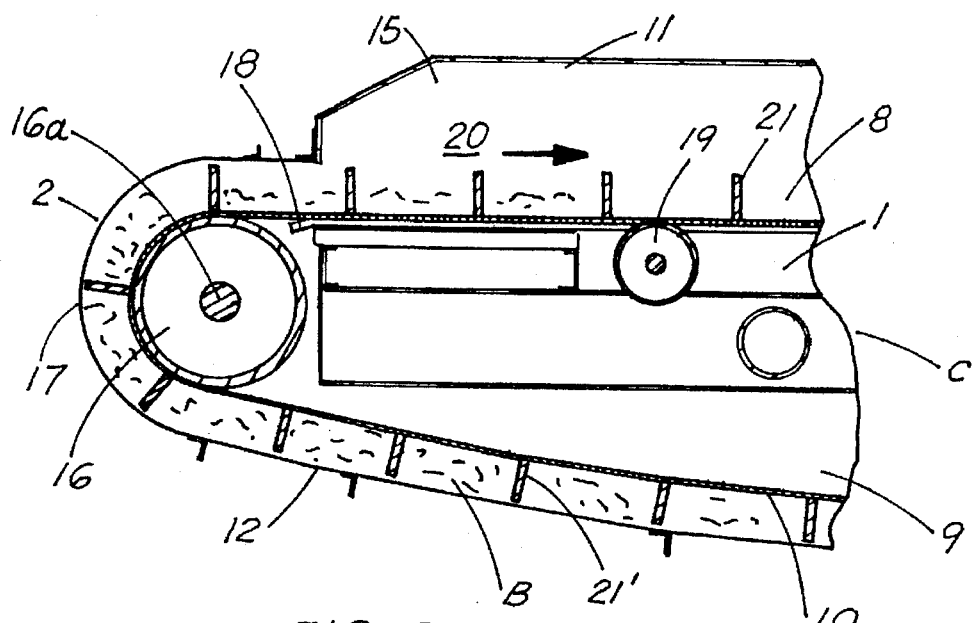
FIG. 2 illustrates a closeup, partially cut-away view of the first, lower end of the high cleat conveyor of FIG. 1, illustrating the conveyor belt path, intake area, and return boot function.

Referring to FIG. 2, the first, lower end 2 of the conveyor C comprises a tail pulley 16 situated about an axle 16a, which is laterally situated relative to, and supported by, frame 1. The pulley 16 supports a belt 10, guiding it about the end of the pulley. The belt further comprises a plurality of laterally situated, generally evenly spaced cleats 21, 21'.

On the upper, support face 8 of the conveyor, the belt 10 glides forward 20 over a plurality of support rollers 19 having an impact bed 18 juxtaposed therebetween. As indicated above, a skirt plate 11 is provided along opposing sides of the belt, to prevent material from spilling. Input area 15 is provided on the upper, support face 8, adjacent to the first end, for receiving the material to be conveyed.

Situated at the lower side 9 of the conveyor C, comprises an underpan 12 configured to envelope the belt 10 and generally downwardly cleats 21', this arrangement effectively conveying spillage and dust, as well as material falling to discharge back along the underpan, via the cleats, through a boot area 17 enveloping the end of the conveyor, dispensing the material back onto the upper, support face 8. The boot area 17 comprises first and second side walls, each said side wall having first, inner and second, outer edges, the first inner edge of each wall affixed to the frame about the tail pulley 16, the second, outer edge of each wall supporting a cover, said cover situated within close proximity of any adjacent belt cleats.

Figure 3:
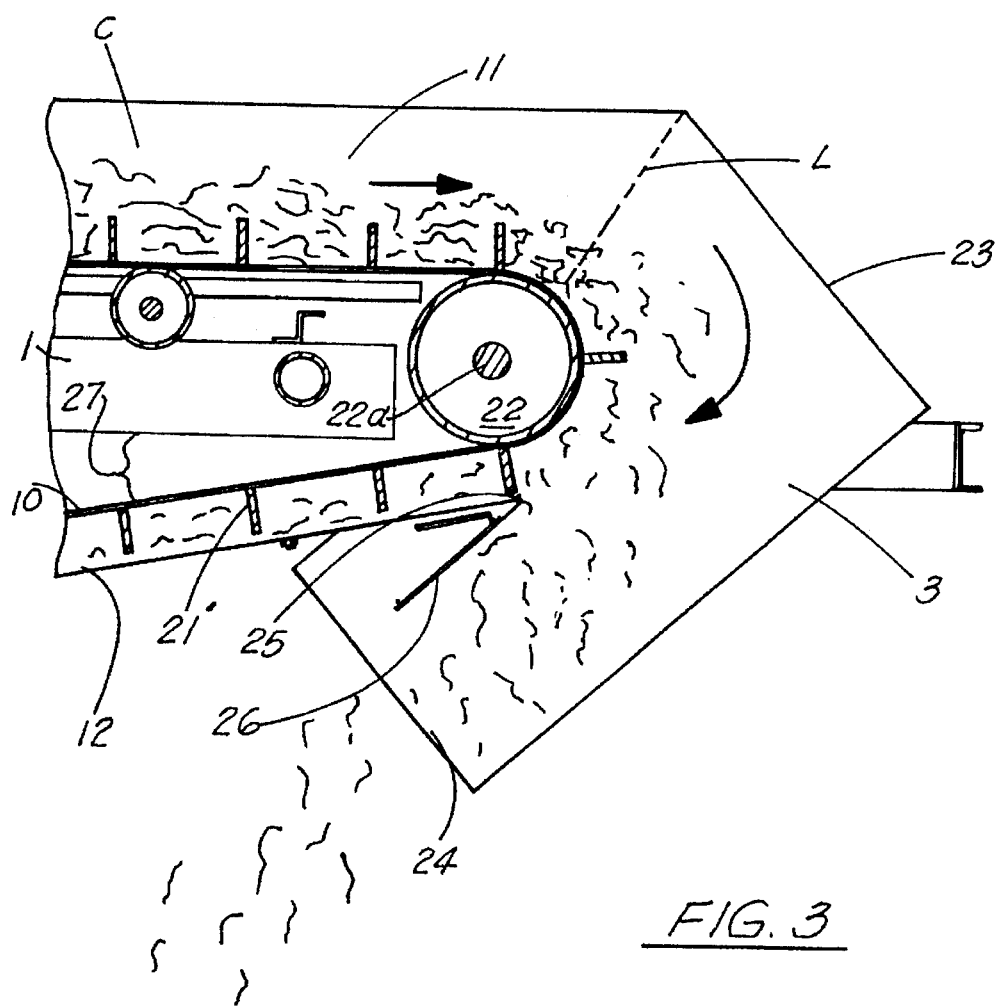
FIG. 3 illustrates a closeup, partially cut-away view of the second, upper end of the high cleat conveyor of FIG. 1, illustrating the jettison chute for expelling the conveyed material, as well as the transition plate to the underpan.

FIG. 3 illustrates in detail the operation of the second, upper end 3 of the conveyor C, wherein there is provided a head pulley 22, situated about axle 22a, which guides the belt 10 about the end of the pulley (and frame end), as well as any material on the belt into chute 23, for dispensing via the mouth 24. Transition area 25 is provided adjacent to the underside of pulley 22, receiving the belt, while directing the material conveyed thereon out of the mouth 24 of chute 23. Transition plate 26, situated in the chute generally adjacent to axle 22a and downwardly emanating at a 20–50 degree angle back toward the frame, further guides the material away from the belt and through the chute. The utilization of the transition plate, in combination with the centrifugal force generated by the rotation of the belt about the head pulley, tends to displace most of the material conveyed by the belt.

As further shown, the belt 10, once passing about pulley 22, returns under the frame 1, with the cleats 21' being enveloped by underpan 12, as discussed above. Any debris or unjettisoned material remaining on the belt is then guided via underpan, and directed via cleats 21', about the underside of the frame and back atop the conveyor, to be re-dispensed. The belt may ride somewhat loosely under the frame, with a space 27 therebetween.

Figure 6:
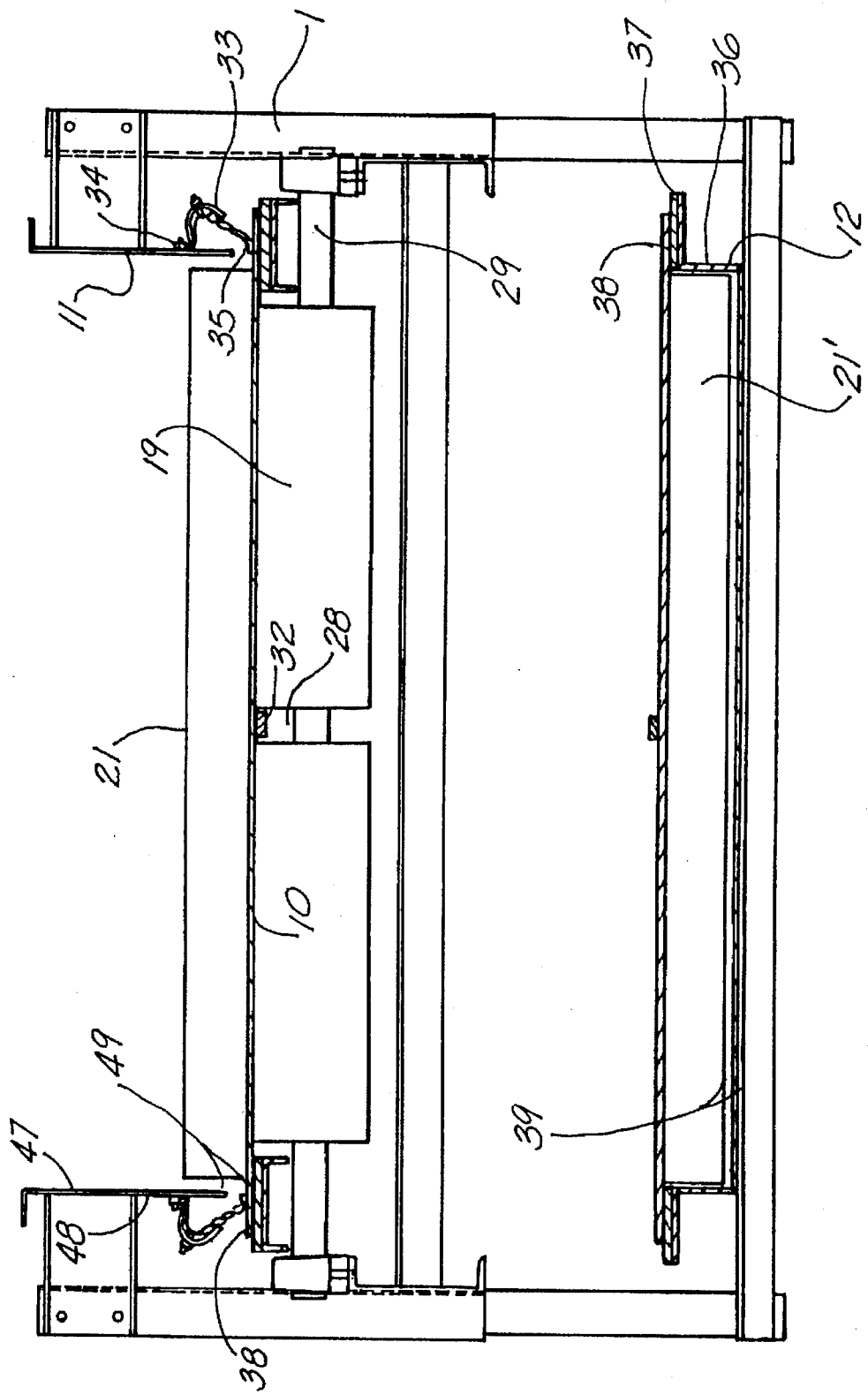
FIG. 6 illustrates a longitudinal, partially cut-away, partially cross-sectional view of the high cleat conveyor of FIG. 1, illustrating the belt center guide, and corresponding center guide slot in the rollers, as well as the interaction of the belt and the underpan, and the side skirt and frame construction.

Referring now to FIG. 5, illustrating a top view of the upper side of the conveyor, the belt 10 rides, as indicated above, upon a series of rollers 19 riding upon axles 29. With the preferred embodiment of the invention, each roller 19 further includes a generally medially situated guide space 28, as do the head 22 and tail 16 pulleys, as well as guide space 30, configured to communicate with and envelope guide bar (32, as shown in FIG. 6) formed in the underside the belt, for urging the belt 10 to maintain its longitudinal alignment with the frame. Stringers 31 may be spaced along the frame, under the impact pad, to provide enhanced strength and stability. An impact pad 18 may be provided if desired. The loading zone from the gravity chute may contain an impact pad 31, if desired, which may further include an impact sheet thereon 18 of stainless steel sheeting, plastic, or the like.

Continuing with FIG. 6, which illustrates a longitudinal, partially cut-away, partially cross-sectional view of the present invention, the belt 10 includes a generally medially disposed center guide bar 32 on the underside of the belt (the side opposite the cleats 21), said guide bar configured to communicate with the guide space 28 of each of the rollers 19 (including the end rollers), as indicated above. As further disclosed supra, skirt plates 11 are provided on opposing sides of the belt 10, above 49 the outer, non cleated sides 38 of belt, with the cleats 21 therebetween. The skirt plates ride along the top side of the conveyor, supported by the frame, to prevent spillage of material from the sides. Each skirt plate has a forward face 47 and a rear face 48, the forward face juxtaposed the cleated, carrying area of the belt, the rear face 48 opposite the forward face.

Affixed 34 to the rear face 48 of each of the skirt plates is a belt edge seal 33 having first and second ends, the first end affixed to the skirt plate, the second end in sliding communication with the outer side area of the belts, the edge seal effectively preventing material from migrating under the skirt plates, while providing consistent pressure on the belt outer sides, against the impact pad (on the frame), while preventing the migration of fines or material therethrough. An example of a belt edge seal suitable for use with the preferred, exemplary embodiment of the present invention is the Dravo Wellman's Flexiskirt model number 1001.

On the underside of the conveyor, the belt and cleats 21' are guided along by the side walls 36 and support member 37 (upon which the outer side walls 38 of the belt ride) along each side of the underpan 12. Note the nominal clearance 39 between the cleat and bottom of the underpan 12; this facilitates the conveying of fines and any other debris in the underpan towards and through the boot, to the conveyor topside, as discussed supra.

Figure 7:
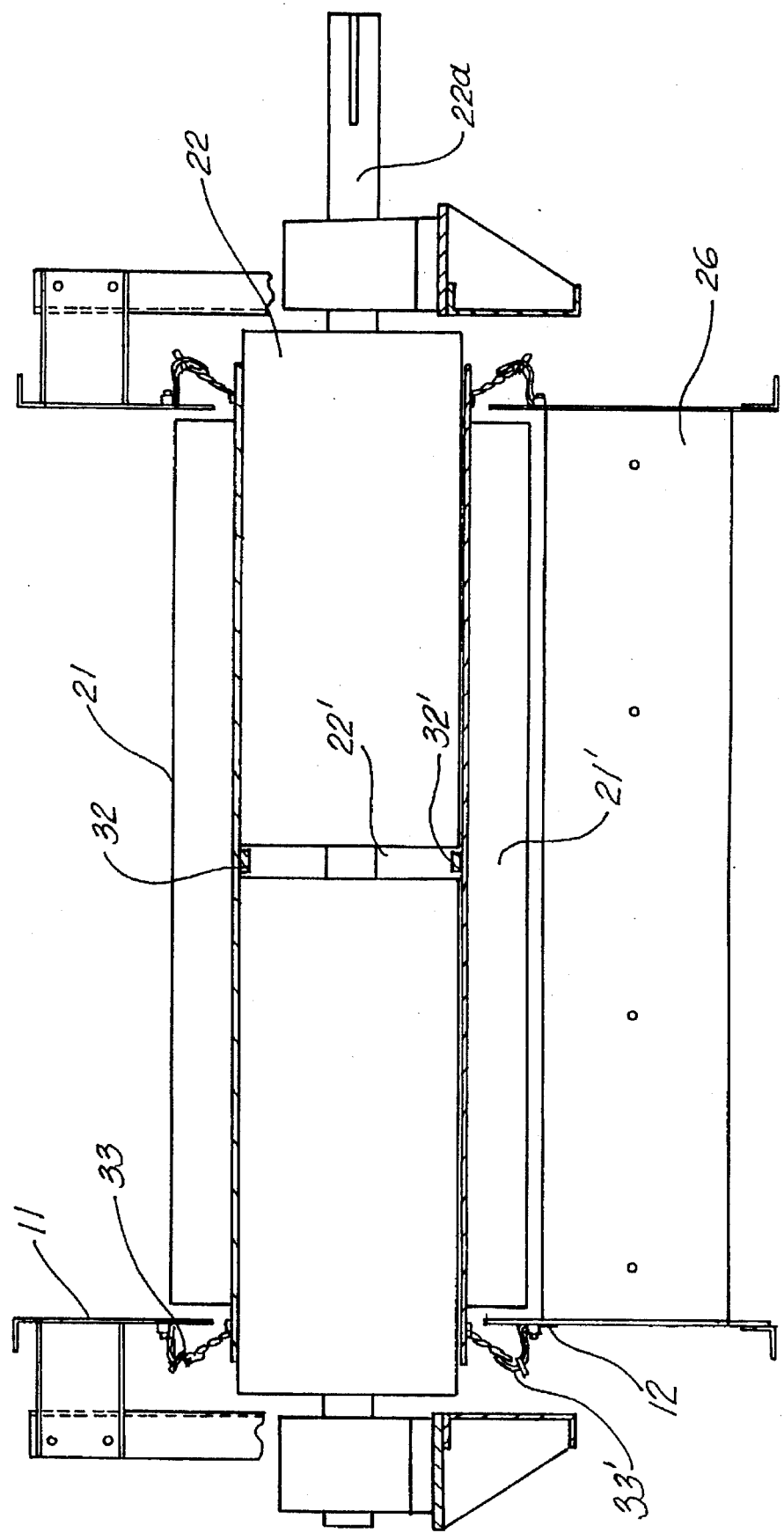
FIG. 7 illustrates an end view, partially cut-away, partially cross-sectional view of the high cleat conveyor of FIG. 1, illustrating the interaction of the belt, the transition plate, the drive roller, and the cleat and underpan arrangement.
Figure 6:
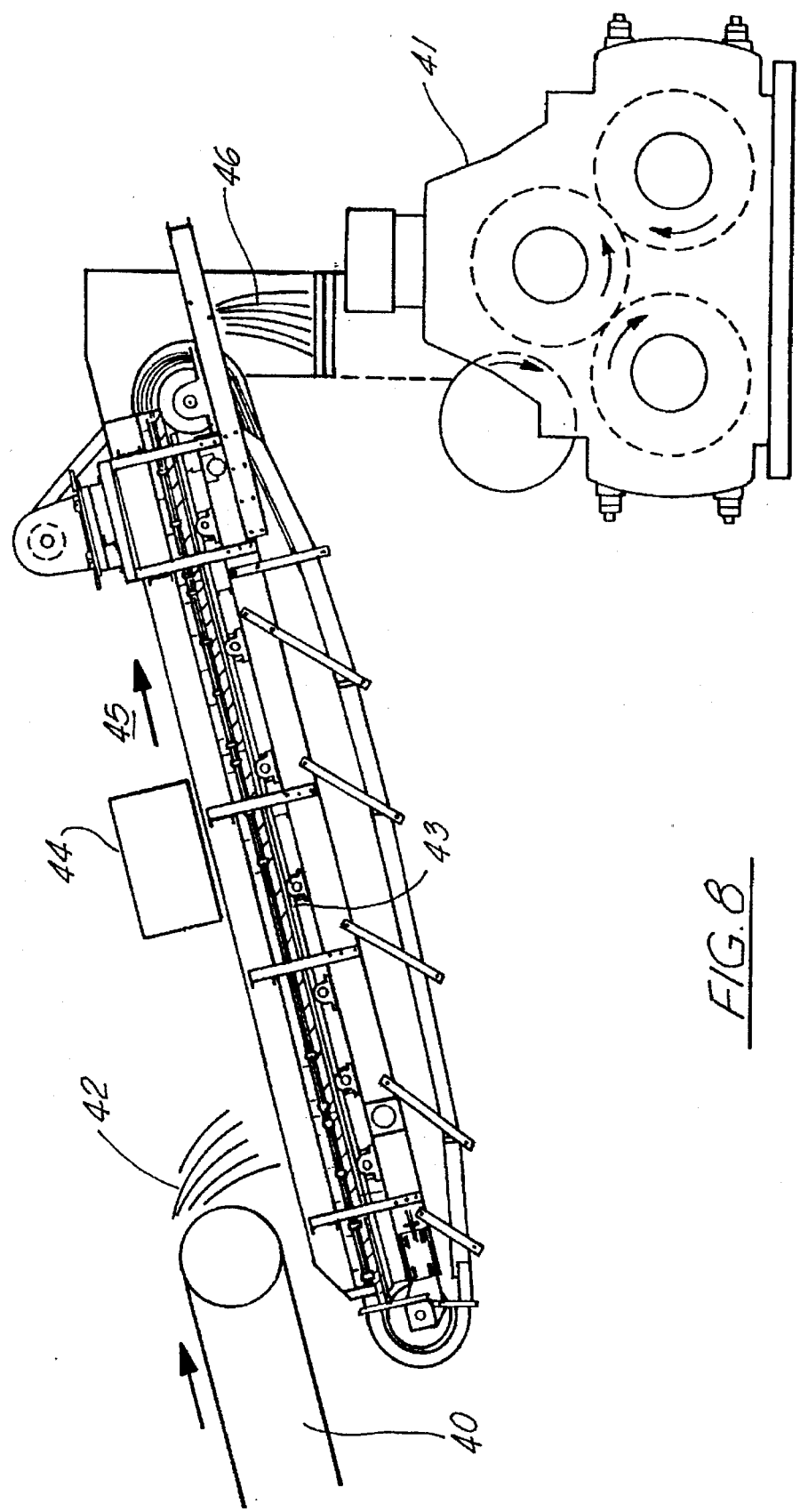

FIG. 7 illustrates a partially cutaway view of the discharge end of the conveyor of the present invention, illustrating the head pulley 22 supported by the axle 22a, the pulley having formed generally medially therein belt guide space 22', accommodating belt center guide 32, 32', about the exposed face of the pulley. Skirt plates 11 meet L chute 23 in the general vicinity of the head pulley, but the belt edge seals continue on in the manner above taught, except that said belt edge seals are affixed to their respective rear face of chute 23, instead of the skirt plate. As further shown, the belt and belt edge seals 33 wrap about the exposed face and outer sides of head pulley 22, respectfully, the edge seal 33' terminating upon contact with the underpan 12 and transition plate 26. This tapered and curved sealing system, utilizing the belt edge seal to wrap about the pulley, can also be implemented with the tail pulley, in the boot area.

The exemplary embodiment of the present invention contemplates usage with a belt having a width of, for example, eighty-eight inches or wider, with a cleat height ranging one to ten inches; the belt speed can range from 220–400 feet per minute, the particulars of each dependent upon the material conveyed, the angle and length of the conveyor, and the particular application and equipment utilized therewith. Further, smaller belts and lesser speeds and cleat heights may be utilized, depending upon the application.

The support rollers may be substituted in their entirety with the impact bed, by utilizing material with a low friction coefficient, such as, for example, stainless steel, plastic, etc, depending upon the application.

An alternative embodiment of the system of the present invention taught above, utilizing the present conveyor, is illustrated in FIG. 8, wherein a cane carrier 40 is utilized to load chopped cane 42 onto the conveyor belt 43, wherein the cane passes 45 under a magnet 44 for removal of ferris metals, and is dumped 46 into mill 41.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A conveyor for conveying a material away from a first material handling area, at an angle, and discharging said material via gravity to a second material handling area, said conveyor comprising:

a frame having first and second ends, upon which there is laterally and rotatingly affixed thereto a tail and head pulley, respectively, said frame further having upper and lower sides and first and second edges;

an endless belt formed of a continuous member of flexible, sheet-type material, said belt having a conveying side, upon which emanates from the medial area of said belts conveying side a plurality of evenly spaced and generally laterally situated, projecting cleats having outer edges, said conveying side of said belt having a first and a second generally flat outer edge area disposed about said medial area of said belt, respectively, said belt running longitudinally along the upper side of said frame, about said first and second ends of said frame, and generally below said under side of said frame;

first and second skirts affixed to said upper side of said frame, said first and second skirts situated above said first and second outer edge areas of said belt, respectively, each of said first and second skirts having an inner side and an outer side, said inner side of each skin facing said cleats, each of said skirts having first and second ends;

a first belt edge seal having first and second edges, said first edge affixed to the outer side of said first skirt, said second edge in consistent, sliding communication with and providing bias against said first outer side area of said belt, thereby preventing material from migrating under said first skirt, while providing consistent pressure on said first outer side of said belt;

a second belt edge seal having first and second edge, said first edge affixed to said outer side of said second skirt, said second end of said second belt edge seal in consistent, sliding communication with, and providing bias against, said first outer side area of said belt, thereby preventing material from migrating under said second skirt, while providing consistent pressure on second outer side of said belt;

discharge means situated at said second end of said frame for discharging material from said belt;

an underpan having first and second ends generally corresponding with said first and second ends of said frame, said underpan generally being longitudinally aligned with and situated under said lower side of said frame, said underpan having a bottom wall and first and second, opposing, side walls, said underpan configured to engage said belt running generally below said underside of said frame, and envelope the outer edges of said cleats of said belt, said second end of said underpan adjacent to said discharge means, said second end of said underpan having further situated thereby, within said discharge means, a transition plate downwardly emanating at a 20–50 degree angle back toward the frame;

a boot having first and second ends, said first end affixed to said underpan, said second end affixed to said first ends of said first and second skirts, said boot enveloping said first end of said frame and said outer edges of said cleats and the portion of said belt in communication with said tail pulley.

2. The conveyor of claim 1, wherein each of said first and second side walls of said underpan has affixed thereto a support member configured to engage and support said outer side wall of said belt.

3. The conveyor of claim 1, wherein there is provided belt alignment means for maintaining said belt in alignment with said head and tail rollers.

4. The conveyor of claim 1, wherein there is provided a plurality of generally laterally situated, generally aligned, support rollers supported by said frame between said head and tail pulleys.

5. The conveyor of claim 4, wherein there is provided an impact pad juxtaposed between said support rollers.

6. The conveyor of claim 1, wherein there is provided magnetic means situated above said skirts for attracting ferris material from said conveyed material on said belt.

discharge means situated at said second end of said frame for discharging material from said belt;

an underpan having first and second ends generally corresponding with said first and second ends of said frame, said underpan generally being longitudinally aligned with and situated under said lower side of said frame, said underpan having a bottom wall and first and second, opposing, side walls, said underpan configured to engage said belt running generally below said underside of said frame, and envelope the outer edges of said cleats of said belt, said second end of said underpan adjacent to said discharge means;

a boot having first and second ends, said first end affixed to said underpan, said second end affixed to said first ends of said first and second skirts, said boot enveloping said first end of said frame and said outer edges of said cleats and the portion of said belt in communication with said tail pulley;

b. juxtaposing said conveyor at an incline between said first and second mills, such that said first end of said frame Is generally adjacent to said base of said first mill, and said second end of said frame is adjacent to said donnely chute on said second mill;

c. positioning said gravity chute of said first mill such that bagasse flows from said first mill to said top conveying area of said conveyor;

d. engaging said drive means for driving said belt;

e. utilizing said cleats on said belt to urge bagasse up said incline, conveying said bagasse up said frame;

f. dispensing said bagasse into said donnely chute;

g. capturing any remaining bagasse situated on said belt after having passed said head pulley; and h. utilizing said cleats on said belt to guide any remaining bagasse on said belt through said underpan, through said boot, and back onto said top conveying area of said conveyor.

7. A conveyor for conveying a material away from a first material handling area, at an angle and discharging said material via gravity to a second material handling area, said conveyor comprising:

frame having first and second ends, upon which there is laterally and rotatingly affixed thereto a tail and head pulley, respectively, said frame having situated thereon between said head and tail pulleys a plurality of generally laterally Situated, somewhat aligned, support rollers, said support rollers having juxtaposed therebetween an impact pad, said frame further having upper and lower sides and first and second edges;

an endless belt formed of a continuous member of flexible, sheet-type material, said belt having a conveying side, upon which emanates from the medial area of said belts conveying side a plurality of evenly spaced and generally laterally situated projecting cleats having outer edges, said conveying side of said belt having a first and a second generally flat outer edge area disposed about said medial area of said belt, respectively, said belt running longitudinally along the upper side of said frame, about said first and second ends of said frame, and generally below said under side of said frame;

first and second skirts affixed to said upper side of said frame, said first and second skirts situated above said first and second outer edge areas of said belt, respectively, each of said first and second skirts having an inner side and an outer side, said inner side of each skirt facing said cleats, each of said skirts having first and second ends;

a first belt edge seal having first and second edges, said first edge affixed to the outer side of said first skirt, said second edge in consistent, sliding communication with and providing bias against said first outer side area of said belt, thereby preventing material from migrating under said first skirt, while providing consistent pressure on said first outer side of said belt;

a second belt edge seal having first and second edge, said first edge affixed to said outer side of said second skirt, said second end of said second belt edge seal in consistent, sliding communication with, and providing bias against, said first outer side area of said belt, thereby preventing material from migrating under said second skirt, while providing consistent pressure on second outer side of said belt;

discharge means situated at said second end of said frame for discharging material from said belt;

an underpan having first and second ends generally corresponding with said first and second ends of skid frame, said underpan generally being longitudinally aligned with and situated under said lower side of said frame, said underpan having a bottom wall and first and second, opposing, side walls, said underpan configured to engage said belt running generally below said underside of said frame, and envelope the outer edges of said cleats of said belt, said second end of said underpan adjacent to said discharge means;

a boot having first and second ends, said first end affixed to said underpan, said second end affixed to said first ends of said first and second skirts, said boot enveloping said first end of said frame and said outer edges of said cleats and the portion of said belt in communication with said tail pulley.

8. The conveyor of claim 7, wherein each of said first and second side walls of said underpan has affixed thereto a support member configured to engage and support said outer side wall of said belt.

9. The conveyer of claim 7, wherein there is provided belt alignment means for maintaining said belt in alignment with said head and tail rollers.

10. The conveyor wherein, said second end of said underpan has further situated thereby, within said discharge means, a transition plate downwardly emanating at a 20–50 degree angle back toward the frame.

* * * * *